(12) United States Patent
Parham, Jr. et al.

(10) Patent No.: US 8,993,887 B2
(45) Date of Patent: Mar. 31, 2015

(54) RIGHT ANGLE TWISTED PAIR CONNECTOR

(75) Inventors: Douglas Francis Parham, Jr., Pelham, NH (US); Zbigniew Woronko, Haverhill, MA (US); David Andrew Gallagher, Plaistow, NH (US)

(73) Assignee: L-COM, Inc., North Andover, MA (US)

( * ) Notice: Subject to any disclaimer, the term of this patent is extended or adjusted under 35 U.S.C. 154(b) by 539 days.

(21) Appl. No.: 12/793,103

(22) Filed: Jun. 3, 2010

(65) Prior Publication Data

US 2011/0108306 A1    May 12, 2011

Related U.S. Application Data

(60) Provisional application No. 61/259,378, filed on Nov. 9, 2009.

(51) Int. Cl.
*H02G 15/02* (2006.01)
*H02G 15/08* (2006.01)
*H02G 3/04* (2006.01)
(Continued)

(52) U.S. Cl.
CPC ............ *H02G 15/076* (2013.01); *H01R 24/64* (2013.01); *H02G 15/007* (2013.01)
USPC ............ 174/81; 174/97; 174/138 E; 439/399; 439/620.11; 439/676; 439/880

(58) Field of Classification Search
CPC ... H02G 15/007; H02G 15/02; H02G 15/025; H02G 15/192; H01R 13/50; H01R 13/562; H01R 13/58; H01R 13/5833; H01R 13/5837; H01R 13/5841; H01R 13/5845; H01R 13/6461; H01R 13/6463; H01R 24/24; H01R 24/2404; H01R 24/64
USPC ........... 174/73.1, 81, 95, 96, 97, 113 C, 138, 174/662, 113 R, 350, 362, 138 E; 439/399, 439/418, 541.5, 620.11, 620.17, 620.23, 439/620.33, 676, 880, 941; D13/154, 155
See application file for complete search history.

(56) References Cited

U.S. PATENT DOCUMENTS

5,295,869 A * 3/1994 Siemon et al. ............ 439/620.22
5,530,787 A * 6/1996 Arnett ............................ 385/137
(Continued)

*Primary Examiner* — Chau N Nguyen
*Assistant Examiner* — Roshn Varghese
(74) *Attorney, Agent, or Firm* — Saul Ewing LLP (57) ABSTRACT

The invention relates to a twisted pair cable and connector combination comprising a cable having a plurality of twisted pairs, each twisted pair comprising a first conductor and a second conductor, an electrical connector having an electrical connection element for each conductor of the cable and a window through which the conductors of the cable enter the connector, wherein each conductor in the cable is electrically coupled to a one of the electrical connection elements in the electrical connector, and a guide element disposed adjacent the window for guiding the twisted pairs into the connector, the guide element having a distal end and a proximal end and a length there between, the guide element curved over the length and including at least one channel running along the length of the guide element body for each twisted pair, the guide element gradually transitioning over the length from a first cross sectional shape wherein said channels are disposed in a pattern relative to each other corresponding to the relative positions of the twisted pairs in the cable to a second cross sectional shape wherein the channels are disposed in a pattern relative to each other corresponding to the relative positions of the electrical connection elements of the connector.

24 Claims, 7 Drawing Sheets

(51) Int. Cl.
*H01F 27/32* (2006.01)
*H01R 4/24* (2006.01)
*H01R 4/26* (2006.01)
*H01R 11/20* (2006.01)
*H01R 13/66* (2006.01)
*H01R 24/00* (2011.01)
*H01R 4/10* (2006.01)
*H02G 15/076* (2006.01)
*H01R 24/64* (2011.01)
*H02G 15/007* (2006.01)

(56) References Cited

U.S. PATENT DOCUMENTS

| | | | |
|---|---|---|---|
| 5,571,035 A * | 11/1996 | Ferrill | 439/676 |
| 5,888,100 A * | 3/1999 | Bofill et al. | 439/676 |
| 6,083,052 A * | 7/2000 | Adams et al. | 439/676 |
| 6,099,345 A * | 8/2000 | Milner et al. | 439/460 |
| 6,225,557 B1 * | 5/2001 | Fonteneau et al. | 174/50 |
| 6,238,235 B1 * | 5/2001 | Shavit et al. | 439/418 |
| 6,276,954 B1 * | 8/2001 | Arnett et al. | 439/418 |
| 6,280,232 B1 * | 8/2001 | Beecher et al. | 439/676 |
| 6,283,768 B1 | 9/2001 | Van Naarden | |
| 6,379,175 B1 * | 4/2002 | Reede | 439/676 |
| 6,431,904 B1 * | 8/2002 | Berelsman | 439/447 |
| 6,524,128 B2 * | 2/2003 | Marowsky et al. | 439/418 |
| 6,604,861 B2 * | 8/2003 | Chen et al. | 439/942 |
| 6,616,482 B2 * | 9/2003 | De La Cruz et al. | 439/607.44 |
| 6,808,315 B2 * | 10/2004 | Asada | 385/86 |
| 7,168,994 B2 * | 1/2007 | Caveney et al. | 439/676 |
| 7,220,149 B2 * | 5/2007 | Pharney | 439/676 |
| 7,267,584 B1 | 9/2007 | Liu | |
| 2002/0177351 A1 * | 11/2002 | Kihira et al. | 439/468 |
| 2003/0100215 A1 | 5/2003 | Bachman | |
| 2003/0224666 A1 * | 12/2003 | Yuan-Huei | 439/676 |
| 2003/0236020 A1 * | 12/2003 | Iamartino et al. | 439/445 |
| 2004/0002252 A1 * | 1/2004 | Hirokawa et al. | 439/418 |
| 2008/0308316 A1 * | 12/2008 | Ferragut et al. | 174/135 |

* cited by examiner

RIGHT ANGLE TWISTED PAIR CONNECTOR

CROSS-REFERENCE TO RELATED APPLICATIONS

This application claims the benefit of U.S. Provisional Patent Application No. 61/259,378, filed Nov. 9, 2009, the entire disclosure of which is hereby incorporated herein by reference.

BACKGROUND OF THE INVENTION

1. Field

The present invention relates to electrical connectors for cables. More particularly, the invention pertains to right angle connectors for cables containing twisted pair conductors, such as RJ-45 data connectors.

2. Background

Transmission of electronic data between computational systems and/or nodes of a communication network over electrical cables is well known. Such cables often employ a multichannel end plug similar in configuration to a rectangular telephone plug. The plug is plugged into a corresponding jack on a piece of equipment to complete a communication link.

One such widely used plug is an "RJ-45" plug.

RJ-45 plugs are commonly used at the ends of Category 5 cables having eight wires or channels comprised of four "twisted pairs." A twisted pair is two wires twisted around each other (like a double helix) over their length. This is an advantageous way to transmit signals when the two wires carry opposite or complementary signals. This typically occurs when one wire is the transmit wire and the other wire is the return wire or when a signal is transmitted as a complementary signal on two wires. The twisting of the two wires about each other causes the electromagnetic fields generated by the two signals to cancel each other out outside of the two wires. This helps reduce or eliminate electromagnetic interference (EMI) from external sources as well as crosstalk between neighboring twisted pairs.

Specifications have been developed for twisted pair cables and the associated connectors in order to provide standardization and minimum quality requirements for such links. One such standard is what is commonly termed "Category 5" or "Cat 5". The specification for Category 5 cables and connectors is defined in ANSI/TIA/EIA-568-A, with clarification in TSB-95. These documents specify performance characteristics and test requirements for frequencies of up to 100 MHz. Most Cat 5 cables in use today are unshielded, relying on the twisted pair design for noise rejection.

Cat 5 cabling is commonly employed to carry many different types of data signals, including basic voice services, token ring, ATM (at up to 155 Mbit/s, over short distances). Cat 5 cabling is most commonly used for 100 Mbit/s networks, such as 100BASE-TX Ethernet. Cat 5 cables include a plurality of insulated twisted pairs housed in a single insulated cable jacket. The Cat 5 specification require three twists per inch of 24 gauge (AWG) copper wires.

The Cat 5 specification has been superseded by the Category 5e specification for structured cabling for computer networks such as Ethernet. Category 5e cabling is an enhanced version of Cat 5 that adds specifications for far end crosstalk. It was formally defined in 2001 as the TIA/EIA-568-B standard. The tighter specifications associated with Category 5e cables make it an excellent choice for use in 1000BASE-T network applications. Cat 5e cable and connector performance characteristics and test methods are defined in TIA/EIA-568-B.2-2001.

RJ-45 plugs are commonly used to terminate Cat 5e cables. In an RJ-45 connector, the ends of the twisted pair wires of the cable are untwisted, laid out (usually in a plane), and electrically connected to contacts in the plug body that will mate to corresponding contacts in a mating RJ-45 jack on a piece of equipment, panel or bulkhead, when the plug and the jack are connected. If the wires of the twisted pairs are unraveled (i.e., untwisted) over even a very short distance at the end of a cable for purposes of connecting the wires to the contacts in the terminating plug, the cable may not meet the requirements of the Category 5e specification. Thus, the wires still should be maintained in the twisted pair configuration up to a point as close as possible to the front end of the plug body before being untwisted and laid out in the aforementioned plane in order to assure that the cable and connector stay within the Category 5e specification.

In applications where the space in front of an RJ-45 jack to which a Category 5e cable with an RJ-45 plug is to be connected is limited, it may be necessary or desirable for the cable to make a sharp bend in as short a distance as possible out of the back of the RJ-45 connector. Generally, the amount by which the cable can be bent adjacent the connector is limited by the properties of the cable and any overmold and/or strain relief placed over the cable adjacent the connector When a twisted pair is bent to form a curve, such as in a right angle connector, the two wires forming the twisted pair have a tendency to separate and/or untwist from each other. The shorter the radius of the curve, the more the wires tend to separate and untwist from each other. Furthermore, the cable and its connector are vulnerable to separation or electrical discontinuity in one or more wires due to the sharp flex at the point of entry of the cable into the connector body. Too sharp of a bend in the wires of a twisted pair also can adversely affect signal quality in the cable.

These phenomena make it difficult to manufacture a twisted pair cable with a right angle connector with a short radius bend. The radius of the arc of the twisted pairs must be relatively long to avoid untwisting or the cable may not meet the Category 5e specification.

SUMMARY OF THE INVENTION

The invention relates to a twisted pair cable and connector combination comprising a cable having a plurality of twisted pairs, each twisted pair comprising a first conductor and a second conductor, an electrical connector having an electrical connection element for each conductor of the cable and a window through which the conductors of the cable enter the connector, wherein each conductor in the cable is electrically coupled to a one of the electrical connection elements in the electrical connector, and a guide element disposed adjacent the window for guiding the twisted pairs into the connector, the guide element having a distal end and a proximal end and a length there between, the guide element curved over the length and including at least one channel running along the length of the guide element body for each twisted pair, the guide element gradually transitioning over the length from a first cross sectional shape wherein said channels are disposed in a pattern relative to each other corresponding to the relative positions of the twisted pairs in the cable to a second cross sectional shape wherein the channels are disposed in a pattern relative to each other corresponding to the relative positions of the electrical connection elements of the connector.

DETAILED DESCRIPTION OF THE INVENTION

Figure 1:
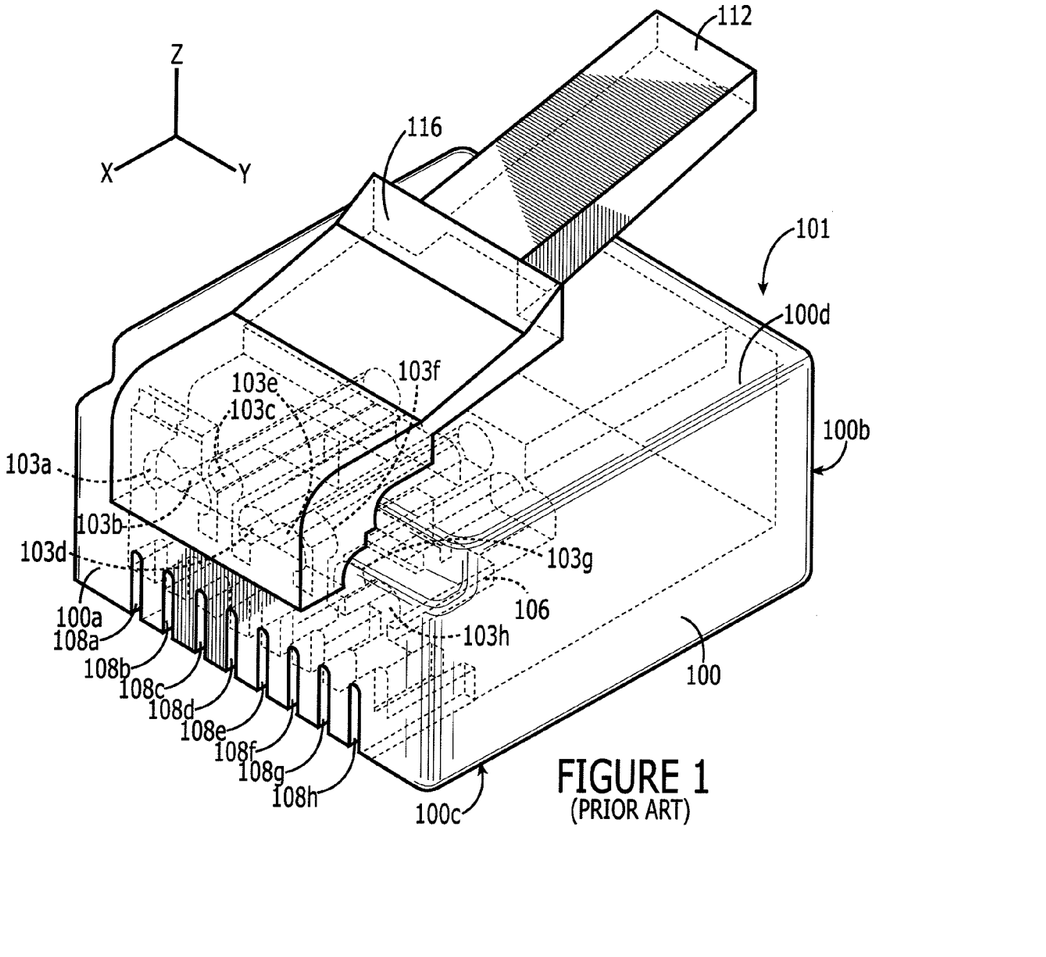
FIG. 1 is a perspective view of a conventional short body RJ-45 plug.

FIG. 1 is a perspective view of an exemplary short form factor RJ-45 plug body 100 that might be placed on the end of a twisted pair cable. This connector may be used to terminate a twisted pair cable, such as Category 5, Category 5e, and Category 6 cables. As used herein, "twisted pair cable" refers to any cable including one or more twisted pairs. By "short form factor", it is meant that the space in between the front and rear faces 100a, 100b of the connector body 100 is less than the average RJ-45 form factor.

RJ-45 plugs are available on the market in many different designs, of which the design shown and described in FIG. 1 and herein below is only one such design for exemplary purposes. As will become clear from the following discussion, the principles of the present invention can be applied in connection with virtually any connector body and any twisted pair cable.

Also, terms such as "front" and "rear" or "proximal" and "distal" as used herein are used relatively to each other and are not intended to imply any particular direction or orientation.

The window 101 through which the wires of a cable enter the body 100 is on the rear face 100b of the plug oriented in the y-z plane. Within the plug body 100, the wires would extend with their longitudinal axes oriented in the x direction. The connector body 100 houses a contact holder assembly (also often called a management bar) 106 near the front end having eight channels therein 103a-103h, each dedicated to one of the wires of the cable.

Although many different designs are known, in general, some form of electrical contact would be disposed in each channel 103a-103h of contact holder 106, such as at the bottom of the channel, to which the wires in the channels may be crimped or otherwise affixed in electrical contact therewith. Each contact provides electrical connectivity from the corresponding wire channel 103a-103h into a corresponding slot 108a-108h that extends to and through the front face 100a and the bottom face 100c of the plug body 100. The slots 108a-108h will accept eight corresponding conductors of an RJ-45 jack when the plug 100 is inserted into a corresponding jack so that the eight conductors in the RJ-45 jack will contact the eight traces 108a-108h in the plug 100 to provide electrical connection.

A flexible release lever 112 is cantilevered from the upper face 100d of the connector body 100. The lever 112 includes a latch 116 that is releasably engageable with a corresponding formation on the body of a jack into which the plug is inserted as is well-known with respect to RJ-45 connectors.

Beyond the rear face 100b of the connector body 100, the wires can be bent subject to a number of various practical constraints. Most notably, the physical properties of the cable itself, including the eight conductors and their individual insulators, any strain relief boot over the cable and any outer insulative cable jacket may limit the minimum radius to which the cable can be reasonably bent. Furthermore, excessive bending adjacent the connector body might overly strain the crimp or other means of holding the cable or the individual wires of the cable within the connector body 100 and to the contacts in the body, possibly leading to an electrical interruption in one or more of the wires. Further, bending the cable tends to cause the individual wires of a twisted pair to physically separate from each other and untwist. Finally, too sharp of an angle in the wires could adversely affect signal transmission properties of the wires.

In any event, once the eight wires (four twisted pairs) of the cable enter the plug body 100 through the window 101 in the rear face 100b of the plug body, they must be untwisted so that each wire can separately enter one of the eight parallel channels 103a-103h in the plug body 100 and spaced according to the RJ-45 standard spacing.

Figures 2, 3A:
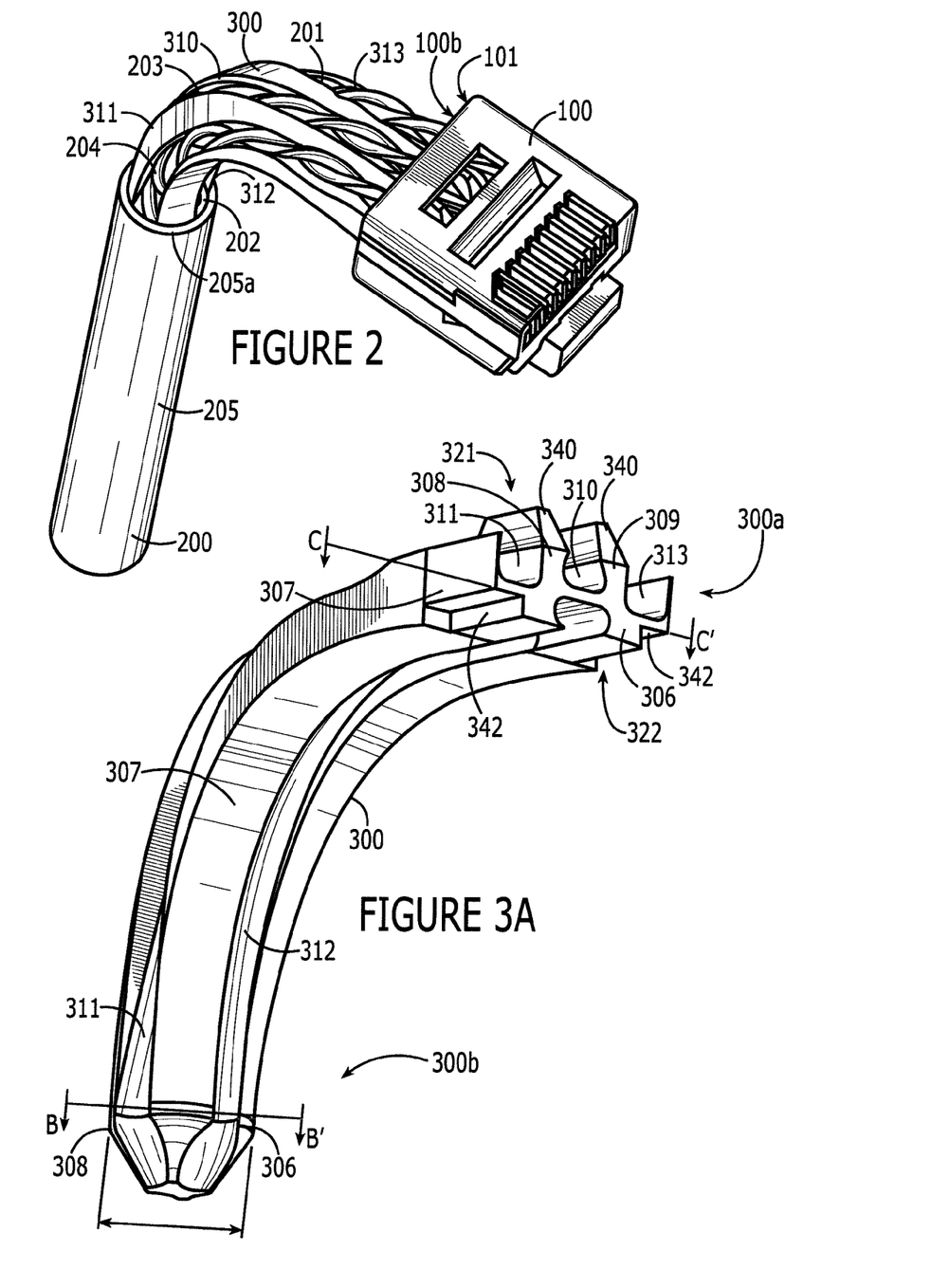
FIG. 2 is a perspective view of the end of a twisted pair cable terminated with an RJ-45 connector in accordance with one embodiment of the present invention with the overmold omitted.
FIG. 3A is perspective view of the guide element of the cable termination of FIG. 2.

FIG. 2 is a perspective view of the short form plug body 100 of FIG. 1 connected to a twisted pair cable 200 in accordance with the principles of one embodiment of the present invention. The exemplary twisted pair cable 200 comprises four twisted pairs (eight wires) 201, 202, 203, 204 of individually insulated 24 gauge wire (23 to 26 gauge wire being common for twisted pair cabling). In addition, those eight wires are within another insulative jacket 205 containing all eight wires. The insulative jacket 205 is terminated before the ends of the twisted pairs contained therein, leaving about 1.5 to 2 inches of the twisted pairs 201, 202, 203, 204 exposed beyond the end of the insulative jacket 205.

Figure 3B:
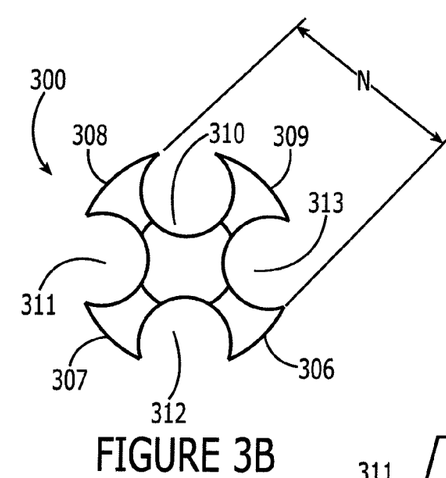
FIG. 3B is cross sectional view of the distal end of the guide element taken along cut B-B in FIG. 3A.
Figure 3C:
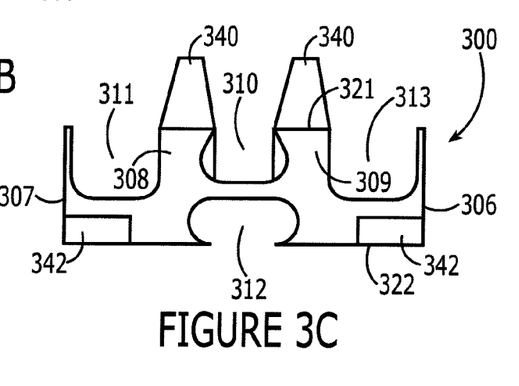
FIG. 3C is cross sectional view of the proximal end of the guide element taken along cut C-C in FIG. 3A.

A guide element 300 is positioned between the end 205a of the insulative jacket 205 and the window 101 on the rear face 100b of the connector body 100. The guide element 300 also is shown separately in FIGS. 3A, 3B and 3C. FIG. 3A is a perspective view of guide element 300. FIG. 3B is a cross-sectional view of the distal end 300b of guide element 300 taken through section B-B in FIG. 3A. FIG. 3C is a cross-sectional view of the proximal end 300a of guide element 300 taken through section C-C in FIG. 3A.

The distal end 300b of the guide element may be inserted into the insulative jacket 205. Particularly, the insulative jacket of a Cat 5e cable is commonly made of a material with some resilience. Therefore, the dimension, N, of distal end 300b of the guide element 300 (see FIG. 3B) may be of a size slightly larger than the non-stressed inner diameter of the jacket 205 so that it will form a friction or interference fit with the jacket 205. However, since the guide element 300, twisted pairs, and the end of the jacket 205, upon final assembly will be encased within an outer protective sheath such as an overmold, the guide element 300 alternately may abut the end of the jacket 205 or there may even be a small gap between the end of the jacket 205 and the distal end 300b of the guide element 300. The proximal end 300a of the guide also may be sized so as to form an interference fit with the window 101 on the rear face 100b of the plug body 100. In this regard, formations may be positioned in the guide element to facilitate alignment, and insertion of the proximal end of the guide element into the back of the connector 100. In the illustrated example of FIGS. 3A-3C, notches 342 are provided at the lower corners of the proximal end of the guide element that mate with corresponding blocks (not shown) at the lower corners inside the rear window 101 of the connector body. Furthermore, in this exemplary embodiment two extensions 340 extend upwardly from legs 308 and 309 to give the proximal end 300a an overall height approximately equal to the height of the window 101 to provide an interference fit vertically (as well as horizontally) to limit the movement and alignment of the proximal end of the guide element within the window 101 of the connector 100 in the Y-Z plane (see FIG. 1). Again, either or both the plug body 100 and the guide element 300 may be formed of a material having some resilience to accommodate an interference fit.

With reference to FIG. 3B, the distal end 300b of the guide element has a cross-section generally in the form of an X or a plus symbol (+). The spaces between the legs 306, 307, 308, 309 of the X pattern essentially form flutes or channels 310, 311, 312, 313, each for accepting one of the twisted pairs 201, 202, 203, 204 of the cable 200. In the illustrated embodiment, the distal end 300b of the guide element 300 essentially has a circular cross section with four flutes (or channels) 310, 311, 312, 313 cut into its outer circumference.

As seen in FIGS. 2 and 3A, the guide member 300, gradually and continuously over substantially all of its length from its distal end 300b to its proximal end 300a changes cross-sectional shape into the shape shown in FIG. 3C in which it still defines four channels, but has flattened out into a generally rectangular cross-section with the flutes/channels 310, 311, 312, 313 disposed in the major surfaces of the rectangle. Thus, at the distal end, the channels are disposed in a generally circular pattern when viewed in cross-section (i.e., the centers of all of the channels 310, 311, 312, 313 can be bisected by a circle) and, at the proximal ends, the channels are disposed in a rectangular pattern when viewed in cross-section (i.e., the centers of the channels can be bisected by a rectangle). In fact, the top three channels are in a linear pattern (i.e., they can be bisected by a single straight line). Particularly, three of the channels 310, 311, 313 are defined in the top surface 321, and one of the channels 312 is defined in the bottom surface 322. The four channels are fairly close to coplanar at the proximal end of the guide (although it can been seen that the lone channel 312 on the bottom surface 322 of the guide element 300 at the proximal end 300a is actually below the three channels on the upper side of the guide). Also, it can be seen in FIG. 3C that leg 307 (which separates channel 311 from channel 312) and leg 306 (which separates channel 312 from channel 313) have each grown to substantial size and generally define the entire lower left and right corners of the proximal end 300a of the guide element 300, respectively.

Generally, the guide element is shaped to gradually transition over its length from a cross sectional shape at one end wherein the channels on the guide element are disposed in a pattern relative to each other corresponding to the relative positions of the plurality of twisted pairs in the cable to a cross sectional shape at the other end wherein the channels are disposed in a pattern relative to each other corresponding to the relative positions of the electrical connection elements of the connector. Commonly, this will be a transition from a generally circular shape to a generally rectangular or even planar shape, but it will depend on the particular cable and the particular connector.

As can further be seen in FIGS. 2 and 3A, over its longitudinal length, the guide also traverses about a 90° arc. The curvature should be selected to provide the minimum reasonable turn radius for the twisted pair wires in view of the various countervailing interests for the particular cable, such as signal quality in the wires and the bending properties of the wires and insulators. FIGS. 5A-5G provide exemplary, suggested dimensions for a particular Category 5e cable containing four twisted pairs of 24 gauge wire. The dimensions shown in the drawings are provided in inches and (millimeters).

The twisted pairs of wires will remain twisted over the entire length of the guide 300 and will only be untwisted after the proximal end of the guide inside the plug body 100.

The twisted pairs 201, 202, 203, 204 are disposed in the channels 310, 311, 312, 313 of the guide element 300 with the channels providing surfaces that closely surround the twisted pairs to keep them from separating or untwisting. Furthermore, the guide element 300 defines the specific curve of the twisted pairs as they enter the plug body 100. In one embodiment, the minimum bend radius may be set as a function of the outer diameter of a twisted pair (i.e., twice the diameter of each individual conductor). For instance, in accordance with industry standards, the minimum bend radius of the guide element 300 is made not less than eight times the outer diameter of the individual wires (including their insulators).

The guide element 300 may be made of a semi-rigid material, such as a suitable plastic, that has some flexibility, but is substantially rigid. Particularly, it is desirable for the guide element to define a relatively fixed bend for the twisted pair wires, but to have a small amount of flexibility to allow slight flexing so that it is not so stiff that it will fracture and break if a person were to push too hard on the cable or the distal end of the guide element when inserting the plug into a jack. Specifically, a slight bit of flexibility would not only make the guide element less susceptible to breakage due to excessive force, but it would also provide a tactile sense to the person handling the plug of the limit of force that can be applied to the distal end of the connector before breakage. In one exemplary embodiment, the guide may be formed of PVC (polyvinyl chloride), ABS (Acrylonitrile butadiene styrene) or other thermo plastics and having a durometer of about 60-90, and preferably around 75. Metal flakes may be included in the guide element to help increase isolation between twisted pairs and/or help impart the desired mechanical properties to the guide element.

The other end of the cable generally will have another connector so that the cable can be used to couple two devices via the cable. The connector at the opposite end of the cable may be a conventional plug or a second plug in accordance with the principles of the present invention. Generally, the cable is terminated with plugs at both ends (and the equipment/device to which a cable is to be connected bears a jack); however, there is nothing in the present invention or the general nature of cables and connectors that prevents a cable from being terminated with a jack, instead of a plug.

Figure 3D:
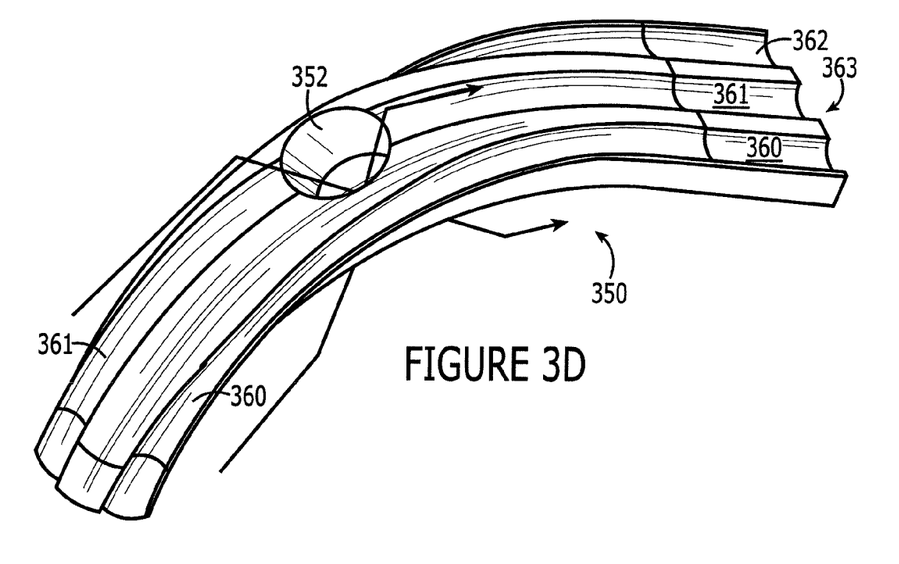
FIG. 3D is a perspective view of an alternative guide element having a pass-through hole intermediate its ends, in accordance with an alternative embodiment of the present invention.

FIG. 3D illustrates an alternative embodiment of the guide element 350 with four channels 360, 361, 362, and 363 and a pass-through hole 352 intermediate the two ends to allow the passing of two twisted pairs through it. This can aid in keeping the twisted pairs the same length inside the connector body. Particularly, when a cable is being terminated to a connector, all of the wires within the cable will almost always be cut to the same length. However, each twisted pair in the cable will traverse a different distance over the length of the guide member because of the different effective radius of curvature of each channel in the guide member. In the guide element of FIGS. 2-3C, the channels in the guide element are quite deep, such that the differences in the distances traversed by all of the twisted pairs is probably negligible. However, note that the channels in the embodiment of FIG. 3D are less deep than the channels in the embodiment of FIGS. 2-3C This will tend to make the guide element stronger and less susceptible to bending or breakage, but will also increase the differences in the distance traversed by each twisted pair. Most notably, for instance, the difference in distance traversed by a twisted pair in channel 361 versus a twisted pair in channel 363 would be the most significant and might be significant enough to cause the twisted pair in channel 363 to be too long in the connector body, while the twisted pair in channel 361 might be too short. The twisted pairs in channels 360 and 362 will be about equal to each other and somewhere between the distances traversed by the twisted pairs in channels 361 and 363.

In order to even up the distance that the various twisted pairs traverse over the curved guide element 350, a twisted pair that starts out in channel 361 at the distal end of the guide element can be passed through the pass-through hole 352 intermediate the two ends of the guide element 350 into channel 363 and continue to the proximal end in channel 363. Likewise, a twisted pair that starts out in channel 363 at the distal end of the guide element can be passed through the pass-through hole intermediate the two ends of the guide element 350 into channel 361 and continue to the proximal end in channel 361. This feature can help make the distance traversed along the guide element 350 by all four twisted pairs approximately equal.

Figure 4:
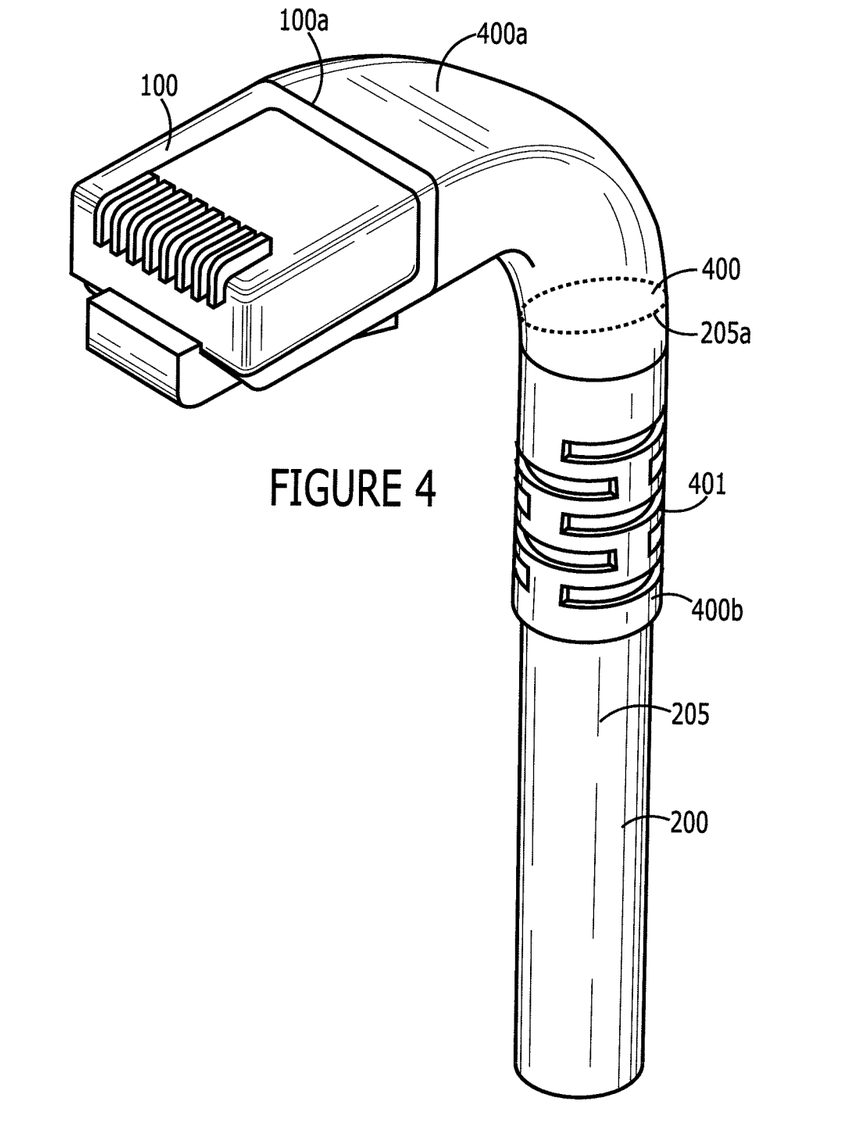
FIG. 4 is a perspective view of the twisted pair cable termination of FIG. 2 with an overmold included.
Figures 5A, 5B, 5D:
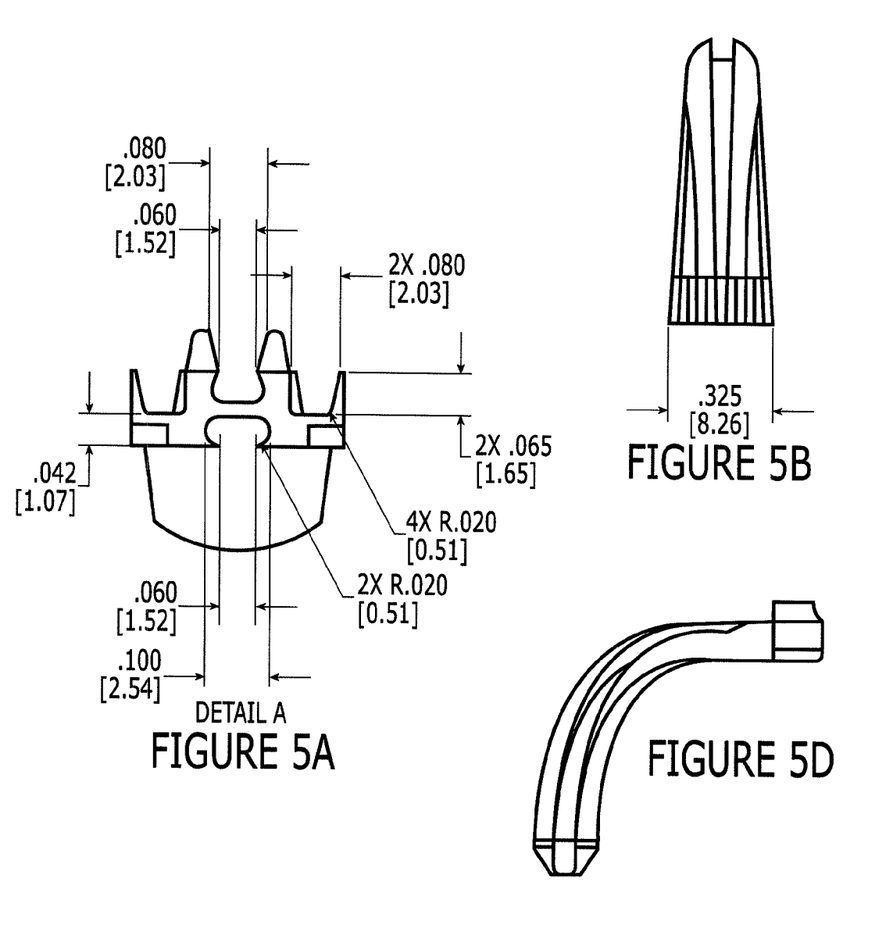
FIG. 5A is a detailed mechanical drawing of the proximal end of an exemplary embodiment of a guide element (section A of FIG. 5E) showing exemplary dimensions.
FIG. 5B is a top view of the exemplary embodiment of a guide element showing exemplary dimensions.
FIG. 5D is a left side view of the exemplary embodiment of a guide element.
Figure 5C:
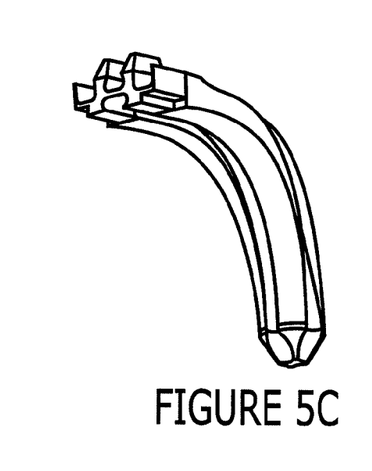
FIG. 5C is a perspective view of the exemplary embodiment of a guide element.
Figure 5E:
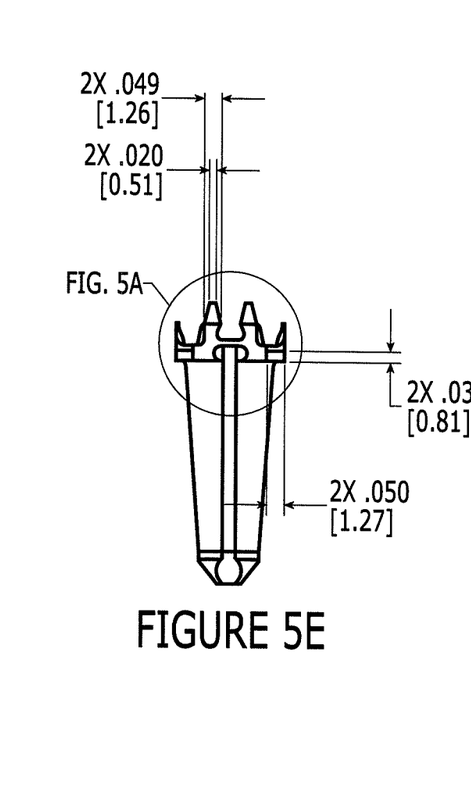
FIG. 5E is a front plan view of the exemplary embodiment of a guide element showing exemplary dimensions.
Figure 5F:
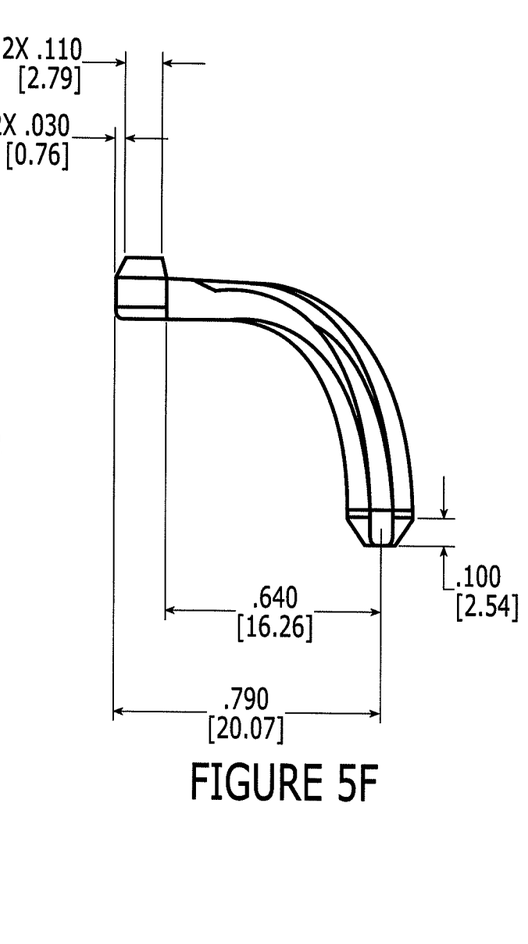
FIG. 5F is a right side view of the exemplary embodiment of a guide element showing exemplary dimensions.
Figure 5G:
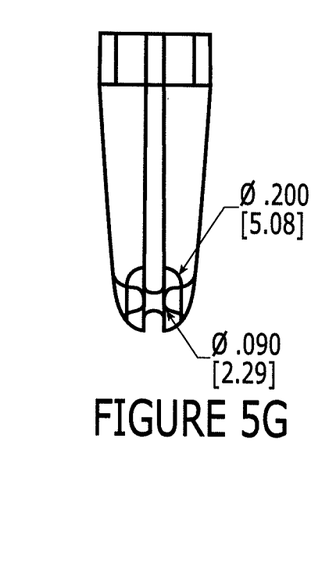
FIG. 5G is a bottom side view of the exemplary embodiment of a guide element showing exemplary dimensions.

Referring now to FIG. 4, which shows the exemplary embodiment of a Category 5e cable having a right angle RJ-45 connector in accordance with the principles of the present invention, but shows a complete assembly, including a flexible overmold 400 insert molded over the guide element 300 and extending between the end of the jacket 205 of the cable 200 and the rear face 100*b* of the connector body 100. Preferably, the overmold 400 is about 0.25-1 inch longer than the guide element 300 so that 0.25-1 inch of the distal end of the overmold 400 overlaps the end of the insulative casing 205 of the cable 200. The end 205*a* of the cable jacket 205 is shown in phantom in the figure illustrating about where the overmold 400 overlaps the cable jacket 205.

The overmold 400 will fill in most, if not all, of the empty space in the channels of the guide element and secure the twisted pairs therein. It is possible to use other forms of encasement, such as a slip on boot. However, preferably, the inner circumference of the encasement will form an interference fit with the ends of the legs 306, 307, 308, 309 of the guide element so as to radially close the channels 310, 311, 312, 313 in the guide element 301 to trap each twisted pair in its respective channel. As shown, the overmold 400 will take the curved shape of the more rigid guide element 300. The proximal end 400*a* of the overmolding 400 butts up against the rear face 100*b* of the connector body 100. The distal end 400*b* substantially overlaps the end of the jacket 205 of the cable 200. The overmold may include a strain relief configuration 401 over the portion of its distal end that is over the cable jacket 205.

The overmold 400 or other form of encasement may change shape over its length between the end 205*a* of the cable jacket and the rear face 100*b* of the connector body in generally the same manner as the guide element 300 changes shape, namely, from being substantially cylindrical at its distal end 400*b* to being substantially rectangular at its proximal end 400*a* and always abutting the ends of the legs 306, 307, 308, 309 of the guide element in order to close the channels and keep the twisted pairs tightly in the channels. This goes for both the internal dimension as well as the external dimension of the encasement.

Preferably, the nominal dimensions of the channels 310, 311, 312, 313 legs 306, 307, 308, 309 of the guide element as encased by the overmold 400 are selected to cause the twisted pairs in the channel to be slightly squeezed between the channel walls of the guide element 300 and internal wall of the overmold 400 so as to help keep the wires of the twisted pairs twisted and in place precisely following the curve dictated by the guide element 300. Assuming, for instance, that the nominal outer diameter of each wire of the twisted pair (including its insulation) is 0.040 inches, then the flutes/channels 310, 311, 312, 313 in the guide member 300 may be semicircular with a nominal radius of 0.020 inches. The term nominal as used herein refers to a dimension when the component is not under any force (e.g., no stress, strain, compression, or expansion). Thus, when the overmold 400 is placed over the guide element 300 and twisted pairs, the overmold will squeeze the twisted pairs in the channels.

Figure 6:
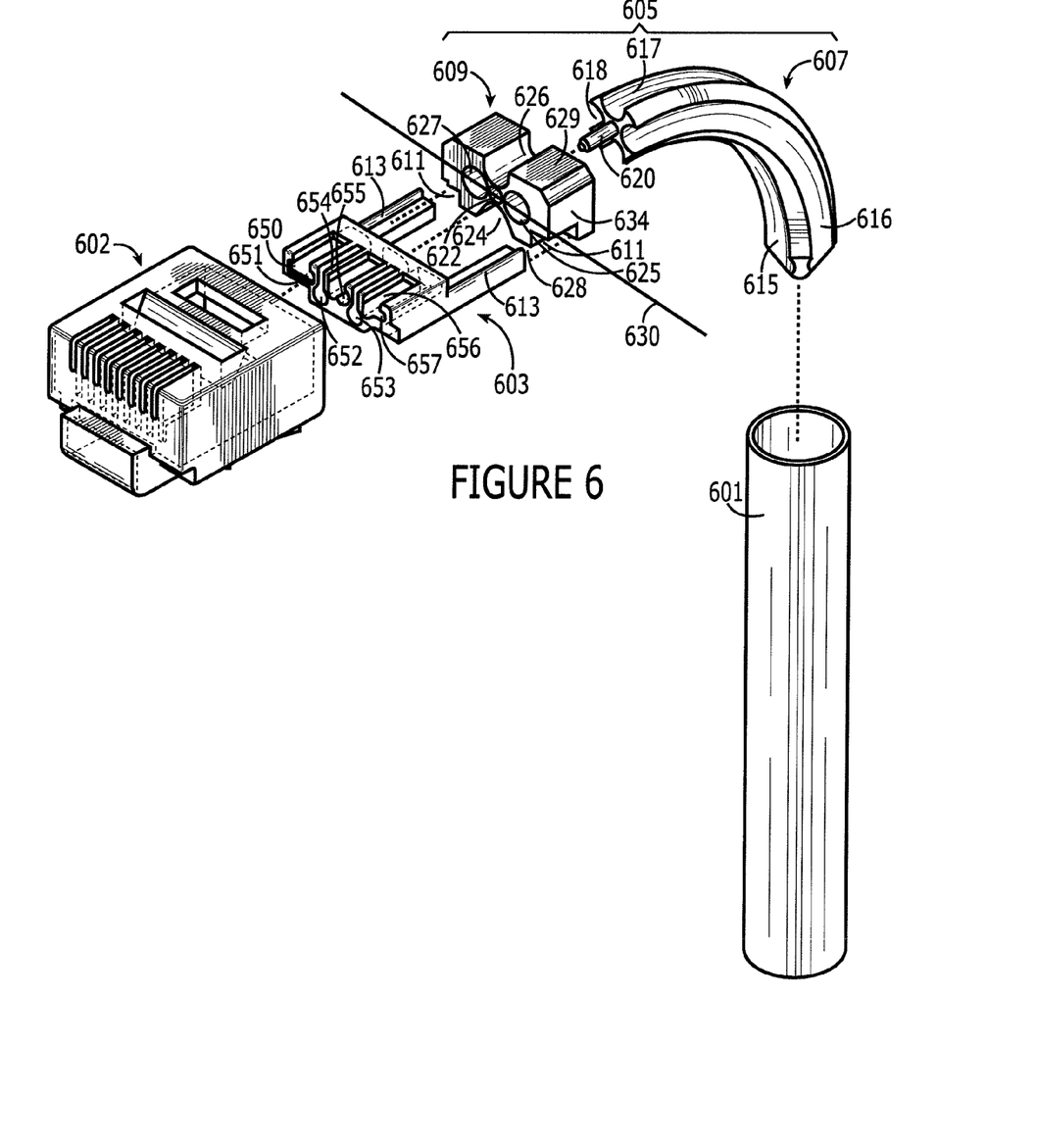
FIG. 6 is a perspective view of components of a cable termination in accordance with a second embodiment.

FIG. 6 shows another embodiment of the present invention. Depicted in FIG. 6 are the end of a cable jacket 601, which may be a conventional cable jacket, an RJ 45 connector body 602, which may be a conventional connector body, a management block 603, which may be a conventional management block, and a guide element 605, comprising two pieces, 607 and 609, in accordance with this second embodiment. The management block 603 depicted is a conventional management block, just as in the embodiment of FIGS. 2 through 5G. However, it is shown in exploded view outside of the connector body in FIG. 6 in order to better illustrate the mating of slots 611 of component 609 of guide element 605 with the rails 613 of the management block for purposes of alignment (which feature also exists in the embodiments of FIGS. 2 through 5G as previously discussed).

In any event, the guide element 605 of this embodiment comprises two separable components 607 and 609. This particular embodiment achieves substantially the same result as the previously described embodiments, but may be easier to manufacture. Particularly, the unitary embodiments previously described, in which the profile of the guide element gradually changes from substantially round to substantially rectangular from end to end is a complex three dimensional shape that may be difficult to machine depending on one's equipment and manufacturing capability. The guide element 605 of the embodiment of FIG. 6 comprises two discrete components 607, 609, each of which is generally easier to manufacture. Particularly, the first component 607 is similar to the guide element 300 discussed above in that it is a longitudinal member that traverses a 90° arc over its length. The first component 607 generally has an X shaped transverse cross section defining four channels 615, 616, 617, and 618 disposed at 90° intervals around it radially. However, unlike the guide element 300, the cross sectional profile of first component 607 remains substantially consistent over its entire length. This uniformity over its entire length makes it generally easier to manufacture. For instance, it may be manufactured initially as a straight longitudinal member of uniform transverse profile and then bent and heat set into a curve. The second component also can be manufactured easily insofar as all contour lines are essentially straight and in one of two dimensions.

A pin 620 extends from the center of the distal end of component 609. This pin mates with a hole 622 in the second component 609 of the guide element 605. The pin 620 may have a diameter slightly larger than the diameter of the hole 622 so as to form an interference fit with hole 622 to hold the two components 609 and 611 together. However, an interference fit is not necessary insofar as the entire assembly can essentially can be held together by an overmold also. Second component 609 essentially forms the proximal end of the guide element 605 and includes four channels 624, 625, 626, and 627 that mate with the channels 615, 616, 617, and 618, respectively, in the first component 607 of guide element 605 to provide four contiguous channels from the distal end Of first component 607 to the proximal end of second component 609 for the twisted pairs to travel through. Particularly, openings 625 and 627 essentially aligned on horizontal axis 630 of second component 609 are round through holes contiguous with channels 616 and 618, respectively, of first component 607. Opening 626 in second component 609 is contiguous with channel 617 of first component 607 and is a substantially semi circular opening in the top surface 629 of second component 609. Opening 626 actually has a short vertical wall extension at the top of the semicircle. Finally, opening 624 in second component 609 is contiguous with channel 615 of first component 607 and is a substantially U-shaped opening in the bottom surface 628 of second component 609.

Thus, as in the previous embodiments, each of four twisted pairs can be placed in one of channel 615, 616, 617, and 618 of the first component 607, which will help guide them over a 90° arc and, at the distal end of those channels, enter contiguous channels 624, 625, 626, and 627 of the second component 609. As in the previous embodiments, the four twisted pairs will exit the distal end of the second component 609 still twisted pairs, oriented 90° from the orientation in which they entered the first component 607, and substantially, although not exactly, coplanar along horizontal axis 630 of second component 609. Particularly, the twisted pairs in holes 625 and 627 will essentially be coplanar in horizontal plane 630. The twisted pair in channel 626 will be slightly above that plane and the twisted pair in channel 624 will be slightly below that plane.

All eight wires will exit from the proximal end of the guide element 605 and can be untwisted and placed in the individual channels in the management block 603. More particularly, the two wires of the twisted pair passing through contiguous channels 618 and 627 of guide element 605 can be untwisted and placed in channels 650 and 651 of management element 603. The two wires of the twisted pair passing through contiguous channels 615 and 624 of guide element 605 can be placed in channel 652 and 653 of management element 603, the two wires of the twisted pair passing through contiguous channels 616 and 625 of guide element 605 can be placed in channels 656 and 657 of management element 603, and the two wires of the twisted pair passing through contiguous channels 617 and 626 of guide element 605 can be placed in channels 654 and 655 of management element 603.

The entire assembly can be assembled with an overmold (not shown) all as described above in connection with previously described embodiments.

While the invention has been described in connection with a Category 5e cable comprising four twisted pairs (8 wires overall) and an RJ-45 plug, it should be understood that this is merely exemplary. The invention may be adapted for application with any cables and connectors comprising any number of twisted pairs. Furthermore, the connector may be a jack rather than a plug. The channels preferably are evenly spaced around the guide element to maximize spacing between the twisted pairs. The channels should transition over the length of the guide element towards the proximal end to the aforedescribed rectangular shape to dispose the proximal ends of the channels so that they are spaced and positioned substantially equivalently to the spacing and positions of the corresponding channels of the selected connector body.

Another advantage of the present invention is that it can help minimize or eliminate alien cross-talk between twisted pairs of two adjacent cables. For instance, as patch panels and the like continue to accommodate more and more densely packed cable connections, alien cross-talk can become a problem. The connector configuration of the present invention can be used to assure that the twisted pairs in each of the adjacent cables enter the channels in the connector in the same layout, e.g., the two wires for channel 1 is always the leftmost two wires in the connector, so that, in a side by side cable layout, the same channels of each cable are maximally spaced from each other.

Generally, the number of channels in the guide element should be equal to the number of twisted pairs in the corresponding cable. However, in order to reduce manufacturing and design costs, one may use any particular guide element in connection with any cable or connector having a number of twisted pairs equal to or less than the number of channels in that particular guide element. Thus, for instance, the exemplary guide element described in connection with the Figures in this specification may be used in association with any twisted pair cable and associated connector having one, two, three, or four twisted pairs.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A twisted pair cable and connector combination comprising:
   a cable comprising a plurality of twisted pairs of conductors, each twisted pair comprising a first conductor and a second conductor, the cable having at least one end;
   an electrical connector having an electrical contact element for each conductor of the cable and a window through which the conductors of the cable enter the electrical connector, wherein each conductor in the cable is electrically coupled to one of the electrical connection elements in the electrical connector; and
   a guide element disposed adjacent the window for guiding the plurality of twisted pairs of conductors into the connector, the guide element having a distal end and a proximal end and a length there-between, the guide element being curved over the length and including one respective curved channel that extends along the length of the guide element from the distal end to the proximal end corresponding to each respective twisted pair of conductors of the cable, the guide element gradually transitioning over the length from a first cross-sectional shape at the distal end, where the channels are disposed in a first pattern relative to each other that corresponds to the relative positions of the plurality of twisted pairs in the cable, to a second cross-sectional shape at the proximal end, where the channels are disposed in a second pattern relative to each other that corresponds to the relative positions of the electrical connection elements of the connector, the second pattern being different from the first pattern;
wherein each one of the curved channels corresponds to a respective one of the twisted pairs, and wherein each of the twisted pairs extends within, and remains twisted over an entire length of, a respective one of the curved channels from the distal end to the proximal end.

2. The combination of claim 1 further comprising:
a sheath disposed around the guide element and twisted pairs.

3. The combination of claim 2 wherein the cable is a Category 5e cable and the connector is an RJ-45 connector.

4. The combination of claim 2 wherein the plurality of twisted pairs comprises at least three twisted pairs and wherein the first cross sectional shape disposes the channels in a substantially circular pattern and the second cross sectional shape disposes the channels in a substantially rectangular pattern.

5. The combination of claim 4 wherein the channels in the guide element are open channels defined on an outer surface of the guide element.

6. The combination of claim 5 wherein the cable further comprises an insulative jacket, the combination further comprising a gap between an end of the jacket and the connector, wherein the twisted pairs, the guide element, and the sheath extend from an end of the jacket to the window, and further wherein the sheath has a distal end and a proximal end and a length there between longer than the guide element, the sheath extending from the rear surface of the connector to and past the end of the jacket with a portion of the distal end of the sheath overlapping the jacket.

7. The combination of claim 6 wherein the proximal end of the guide element extends through the window into the connector and forms an interference fit within the window and wherein the distal end of the guide element extends inside of the jacket of the cable and form an interference fit within the jacket.

8. The combination of claim 5 wherein the sheath is formed of a resilient material and wherein the nominal cross section of the channels is less than the nominal cross section of the twisted pairs of conductors so that the twisted pairs of conductors are squeezed within the channels.

9. The combination of claim 4 wherein the second cross sectional shape is substantially rectangular having first and second opposed major surfaces with a plurality of the channels disposed in the first major surface and at least one channel disposed on the second major surface.

10. The combination of claim 1 wherein the guide element further comprises a pass-through hole intermediate the distal end and the proximal end, the pass-through hole connecting a first one and a second one of the channels, and wherein a first one of the twisted pairs that is disposed in the first channel distally of the pass-through hole passes through the pass-through hole into the second channel and continues toward the proximal end of the guide element in the second channel and a second one of the twisted pairs that is disposed in the second channel distally of the pass-through hole passes through the pass-through hole into the first channel and continues toward the proximal end of the guide element in the first channel.

11. A guide element for guiding a plurality of twisted pairs of conductors of a twisted pair cable through an arc without unraveling, the guide element comprising a guide element body having a first longitudinal end and a second longitudinal end, the body extending between the first and second longitudinal ends and defining a plurality of channels on a surface thereof, each of said plurality of channels traversing an arc between the first and second longitudinal ends, the first longitudinal end having a first cross-section substantially in the shape of a circle with a plurality of flutes, each flute of the first cross-section corresponding to one of the plurality of channels, and the second longitudinal end having a second substantially rectangular cross-section and bearing a plurality of flutes, each flute of the second cross-section corresponding to one of the plurality of channels, wherein the body transitions gradually from the first cross-section to the second cross-section between the first longitudinal end and the second longitudinal end, and wherein both the first longitudinal end and the second longitudinal end have no more than a single one of the plurality of channels corresponding to a respective one of the plurality of twisted pairs, each one of the plurality of channels being dimensioned, at both longitudinal ends, to receive a respective twisted pair of conductors without unraveling.

12. The guide element of claim 11 wherein the plurality of channels comprises four channels and wherein the flutes of the first cross section are disposed at 90° intervals around the circle, and the flutes of the second cross section comprise three flutes in a first major side of the rectangular cross section and one flute in a second major side of the rectangular cross section.

13. The guide element of claim 12 further comprising:
a pass-through hole intermediate the distal end and the proximal end, the pass-through hole connecting a first one and a second one of the channels.

14. A twisted pair cable and connector combination comprising:
a cable comprising a plurality of twisted pairs of conductors, each twisted pair comprising a first conductor and a second conductor, the cable having at least one end;
an electrical connector having an electrical contact element for each conductor of the cable and a window through which the conductors of the cable enter the electrical connector, wherein each conductor in the cable is electrically coupled to a respective one of the electrical connection elements in the electrical connector; and
a guide element disposed adjacent the window for guiding the plurality of twisted pairs of conductors through a curve and into the connector, the guide element comprising:
a first guide piece having a distal end adjacent the cable end and a proximal end and a length there between and forming an arc over the length, the first guide piece having a substantially circular cross-sectional shape transverse to its length, the first guide piece including a plurality of arcuate channels in a surface thereof, each arcuate channel being configured to define a minimum bend radius for accepting and guiding a respective one of the twisted pairs of conductors through the arc along the length of the first guide piece, the minimum bend radius being not less than eight times an outer diameter of a corresponding twisted pair, the outer diameter of the corresponding twisted pair being two times an outer diameter of an individual conductor of the corresponding twisted pair; and
a second guide piece having a distal end adjacent the proximal end of the first guide piece and a proximal end adjacent the connector and a length there between, the second guide piece having a substantially rectangular cross-sectional shape transverse to its length and including a plurality of channels, each channel being positioned to mate longitudinally with a respective one of the plurality of arcuate channels in the first guide piece to accept there through the twisted pair of conductors, wherein each mated one of the pluralities of channels corresponds to a respective one of the twisted pairs, and wherein each of the twisted pairs extends within, and remains twisted over an entire length of, a respective mated one of the pluralities of channels from the distal end of the first guide piece to the proximal end of the second guide piece.

15. The combination of claim 14 wherein the first and second guide pieces are separate and the first guide piece further comprises a pin formed integrally with and extending proximally from the proximal end of the first guide piece and the second guide piece comprises a longitudinal hole for accepting the pin, whereby the first guide piece and the second guide piece may be longitudinally aligned by inserting the pin in the longitudinal hole.

16. The combination of claim 15 wherein the plurality of twisted pairs, plurality of flutes in the first guide piece and the plurality of channels in the second guide piece each comprise four and wherein the channels in the second guide piece comprise two longitudinal through holes and two channels open to a surface of the second guide piece.

17. The combination of claim 15 wherein the curve is 90°.

18. The combination of claim 14 further comprising a sheath disposed around the guide element and twisted pairs and wherein the cable further comprises an insulative jacket, the combination further comprising a gap between an end of the jacket and the connector, wherein the twisted pairs, the guide element, and the sheath extend from an end of the jacket to the window, and further wherein the sheath has a distal end and a proximal end and a length there between longer than the guide element, the sheath extending from the rear surface of the connector to and past the end of the jacket with a portion of the distal end of the sheath overlapping the jacket.

19. The combination of claim 18 wherein the proximal end of the second guide piece extends through the window into the connector and forms an interference fit within the window and wherein the distal end of the first guide piece extends inside of the jacket of the cable and forms an interference fit within the jacket.

20. The combination of claim 18 wherein the sheath is formed of a resilient material and wherein the nominal cross section of the channels is less than the nominal cross section of the twisted pairs of conductors so that the twisted pairs of conductors are squeezed within the channels.

21. A guide element for guiding a plurality of twisted pairs of conductors of a twisted pair cable through an arc without unraveling, the guide element comprising:

a first guide piece having a distal end and a proximal end and a length there between and forming an arc over the length, the first guide piece having a first cross-section transverse to the length substantially in the shape of a circle with a plurality of arcuate flutes, each flute for accepting and guiding a twisted pair of conductors through the arc along the length of the first guide piece without unraveling of the respective twisted pair; and a second guide piece supported on said first guide piece, said second guide piece having a distal end adjacent the proximal end of the first guide piece and a proximal end adjacent the connector and a length there between, the second guide piece having a substantially rectangular cross-sectional shape transverse to its length, different from the shape of the first cross-section, and including a plurality of channels, each channel being positioned to mate longitudinally with a respective one of the plurality of flutes in the first guide piece to accept there through the twisted pair of conductors without unraveling of the respective twisted pair, wherein both the distal end of the first guide piece and the proximal end of the second guide piece have no more than a single mated combination of a respective one of the plurality of arcuate flutes with a respective one of the plurality of channels corresponding to a respective one of the plurality of twisted pairs of conductors, each one of the plurality of mated combinations being dimensioned, at both the distal end of the first guide piece and the proximal end of the second guide piece, to receive a respective twisted pair of conductors without unraveling.

22. The guide element of claim 21 wherein the first and second guide pieces are separate and the first guide piece further comprises a pin extending proximally from the proximal end of the first guide piece and the second guide piece comprises a longitudinal hole for accepting the pin, whereby the first guide piece and the second guide piece may be longitudinally aligned by inserting the pin in the longitudinal hole, said pin and said hole being positioned to permit alignment of said plurality of flutes with said plurality of channels in a plurality of angular orientations of said second guide piece relative to said first guide piece.

23. The guide element of claim 21 wherein the cross section of the second guide piece is adapted to form an interference fit with a window of a connector and the cross section of the first guide piece is adapted to form an interference fit with a cable jacket.

24. The guide element of claim 21, wherein each of said plurality of arcuate flutes has a minimum bend radius, the minimum bend radius being no less than eight times an outer diameter of one conductor of one of said plurality of twisted pairs of conductors.

* * * * *